US009231458B2

(12) United States Patent
Yamaki et al.

(10) Patent No.: US 9,231,458 B2
(45) Date of Patent: Jan. 5, 2016

(54) ROTATION PLATE AND MOTOR

(75) Inventors: Takao Yamaki, Toyohashi (JP); Seiichi Murakami, Hamamatsu (JP); Takeshi Hamanaka, Gifu-ken (JP)

(73) Assignees: AMSO CO., LTD., Shizuoka-ken (JP); GIFU HIGHTECH CO., LTD., Anapachi-gun (JP)

( * ) Notice: Subject to any disclaimer, the term of this patent is extended or adjusted under 35 U.S.C. 154(b) by 912 days.

(21) Appl. No.: 13/442,679

(22) Filed: Apr. 9, 2012

(65) Prior Publication Data

US 2013/0049499 A1 Feb. 28, 2013

(30) Foreign Application Priority Data

Apr. 11, 2011 (JP) ................................ 2011-087656

(51) Int. Cl.

*H02K 11/00* (2006.01)
*H02K 17/30* (2006.01)
*H02K 23/66* (2006.01)
*B60S 1/08* (2006.01)
*B60S 1/16* (2006.01)

(52) U.S. Cl.

CPC . *H02K 17/30* (2013.01); *B60S 1/08* (2013.01); *B60S 1/166* (2013.01); *H02K 23/66* (2013.01)

(58) Field of Classification Search

CPC ......... H02K 3/50; H02K 5/225; H02K 17/30; H02K 23/66
IPC ........................ H02K 3/50, 5/225, 17/30, 23/66
See application file for complete search history.

(56) References Cited

U.S. PATENT DOCUMENTS

| | | | | |
|---|---|---|---|---|
| 5,155,306 | A * | 10/1992 | Iijima et al. | 200/11 DA |
| 6,107,712 | A * | 8/2000 | Yamamura et al. | 310/68 B |
| 6,259,183 | B1 * | 7/2001 | Hotta et al. | 310/233 |
| 6,376,947 | B1 * | 4/2002 | Tateishi | 310/68 R |
| 6,803,687 | B2 | 10/2004 | Murakami et al. | |
| 7,471,021 | B2 | 12/2008 | Yagi et al. | |

FOREIGN PATENT DOCUMENTS

| | | |
|---|---|---|
| JP | 55-56753 U | 4/1980 |
| JP | S62-94594 | 6/1987 |
| JP | H6-62784 | 9/1994 |
| JP | 2004-104884 A | 4/2004 |
| JP | 2004-104885 A | 4/2004 |
| JP | 2004-104886 A | 4/2004 |
| JP | 2005-055355 | 3/2005 |

(Continued)

OTHER PUBLICATIONS

Office Action for JP Application No. 2011-087656, Jan. 7, 2015 (5 pages).

*Primary Examiner* — Dang Le

(74) *Attorney, Agent, or Firm* — Marsh Fischmann & Breyfogle LLP

(57) ABSTRACT

A rotation plate including a surface, in which a fixed contact terminal slides in contact with the surface of the rotation plate. The rotation plate includes a movable contact plate and a holding member. The movable contact plate forms a predetermined conductive pattern. The holding member holds the movable contact plate and is formed from an insulating resin material. The movable contact plate and the holding member are molded integrally and fixed to each other so that a surface of the movable contact plate is exposed and does not project outward from a surface of the holding member.

19 Claims, 9 Drawing Sheets

15
14a
14 (13)
53
68
52
52c
12a
14b
61
81
51
62
L
12b
31
41
42
43
12
(10)
32
12a

(56) References Cited

FOREIGN PATENT DOCUMENTS

| | | | |
|---|---|---|---|
| JP | 2006-151133 | | 6/2006 |
| JP | 2006-199193 | A | 8/2006 |
| JP | 2007-181302 | | 7/2007 |
| JP | 2010-025131 | | 2/2010 |

* cited by examiner 68c
68
68b
68a
52g
68b
68c
14a
15
14a
14 (13)
53
68
52
52c
14b
12a
81
61
51
62
L
12b
31
41
42
43
12
(10)
32
12a 67d
66
53
52g
67c
71
52d
52
52a
52c
64
67b
72
L
62
67a
69
61
51

ROTATION PLATE AND MOTOR

BACKGROUND OF THE INVENTION

The present invention relates to a rotation plate that detects a rotational position of an output shaft or the like and a motor that supplies power in correspondence with the rotational position detected by the rotation plate.

A motor used as a drive source for a vehicle wiper device includes a motor unit and a deceleration unit. The motor unit is supplied with power to drive and rotate a rotation shaft. The deceleration unit decelerates the rotation generated by the motor unit and outputs the decelerated rotation. The motor unit and the deceleration unit are coupled integrally with each other. The deceleration unit accommodates a worm wheel, which forms a deceleration mechanism, and an output shaft, which rotates integrally with the worm wheel. A wiper is coupled by a link mechanism to the output shaft.

In such a motor, when a wiper switch is switched OFF to stop the wiper during a wiping operation, it is desirable that the wiper be operated to a predetermined stop position and stopped at the stop position. Thus, the motor accommodates a rotation plate in the deceleration unit to detect the rotational position of the output shaft and supply power to the motor unit in accordance with the position of the wiper, that is, the rotational position of the output shaft (refer to, for example, Japanese Unexamined Utility Model Publication No. 55-56753).

The rotation plate is formed by fixing a planar movable contact plate, which is punched out into a predetermined conductive pattern from a conductive plate material, to a holding member, which is formed from an insulating material. The rotation plate is circular. The rotation plate is formed to be rotatable with the worm wheel. A plurality of fixed contact terminals that slide in contact with the movable contact plate side surface (i.e., front surface of the rotation plate) of the rotation plate is accommodated in the deceleration unit. In the motor, the rotational position of the output shaft is detected based on contact positions of the fixed contact terminals with the rotation plate.

When the front surface of the movable contact plate projects outward in the axial direction of the motor from the front surface of the holding member, the movable contact plate forms a step on the front surface of the rotation plate, on which the fixed contact terminals slide. Thus, the fixed contact terminals come into contact with a corner formed in the edge of the movable contact plate when sliding from the front surface of the holding member to the front surface of the movable contact plate or when sliding from the front surface of the movable contact plate to the front surface of the holding member. This results in early wear of the fixed contact terminals. Thus, to suppress wear of the fixed contact terminals, a recess shaped in conformance with the movable contact plate and having a depth that is greater than or equal to the plate thickness of the movable contact plate is formed in the front surface of the holding member. The movable contact plate is arranged in the recess. This prevents the front surface of the movable contact plate from projecting outward from the front surface of the holding member. However, the stop position of the wiper or the wiping angle (swing range) of the wiper is set in accordance with the vehicle type. Thus, there are various shapes of conductive patterns, which are set in accordance with the stop position of the wiper or the wiping angle of the wiper. The movable contact plate including the conductive pattern may be formed with any of a variety of shapes in accordance with the vehicle type. Accordingly, a holding member that includes the recess to which the movable contact plate is fixed is also manufactured to have any of a variety of shapes in accordance with the shape of the movable contact plate. For instance, when forming different types of holding members with an insulating resin material, plural types of molds are required to forming the holding members. This increases the manufacturing cost of the rotation plate.

It is an object of the present invention to provide a rotation plate, which reduces manufacturing costs, and a motor, which includes the rotation plate.

To achieve the above object, one aspect of the present invention is a rotation plate including a surface. A fixed contact terminal slides in contact with the surface of the rotation plate. The rotation plate includes a movable contact plate and a holding member. The movable contact plate forms a predetermined conductive pattern. The holding member holds the movable contact plate. The holding member is formed from an insulating resin material. The movable contact plate and the holding member are molded integrally and fixed to each other so that a surface of the movable contact plate is exposed and does not project outward from a surface of the holding member.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

One embodiment of the present invention will now be described with reference to the drawings.

Figure 1:
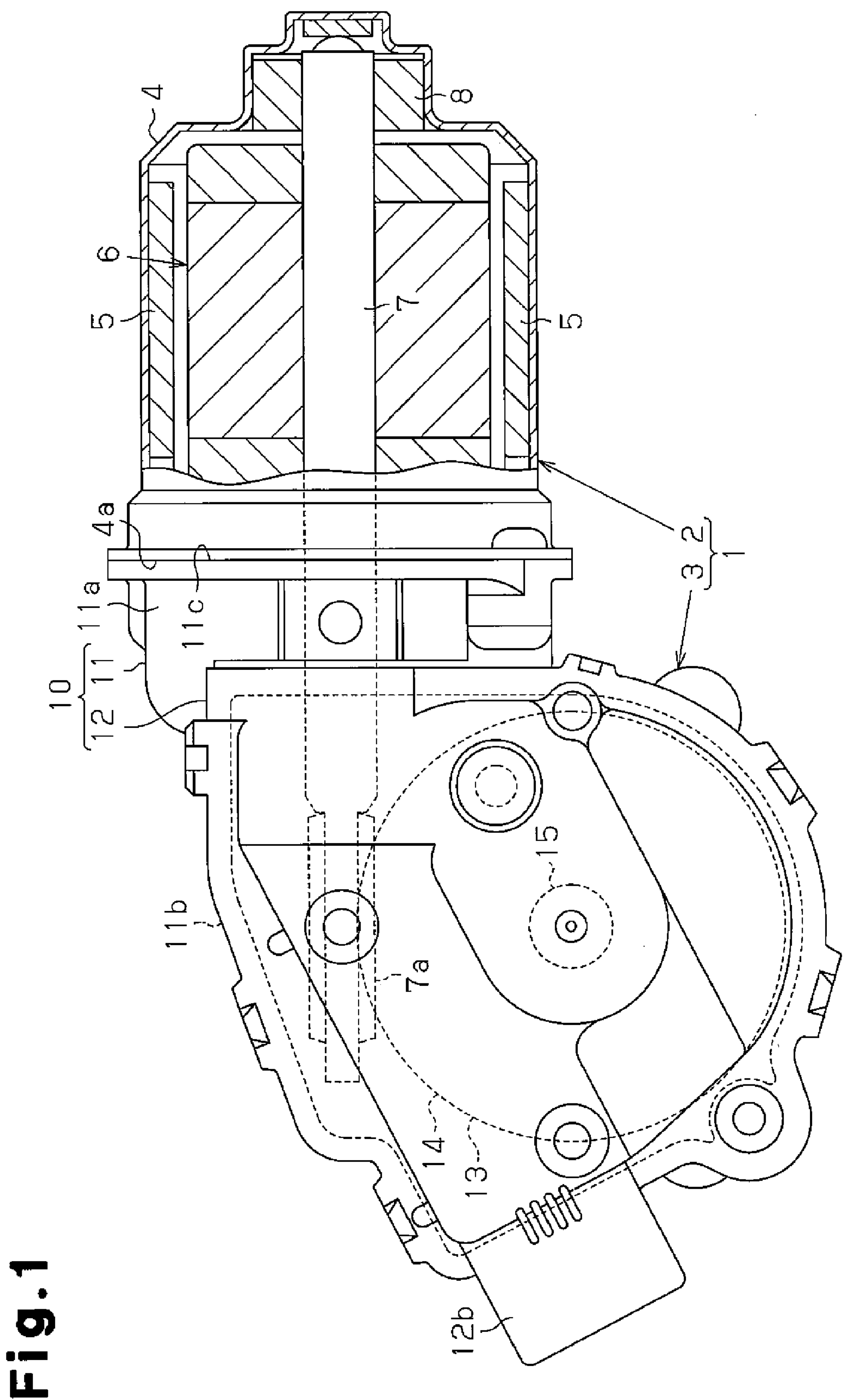
FIG. 1 is a plan view showing a motor according to one embodiment of the present invention.

In the present embodiment, a motor 1, which is shown in FIG. 1, is used as a drive source for a vehicle wiper device that wipes off rain and the like from a windshield of a vehicle. The motor 1 includes a motor unit 2, which generates rotation, and a deceleration unit 3, which decelerates the rotation generated by the motor unit 2 and outputs the decelerated rotation.

The motor unit 2 includes a yoke housing 4 formed from a conductive metal material. The yoke housing 4 is cylindrical and has one closed end. Two pairs of (total of four) magnets 5 are fixed to the inner circumferential surface of the yoke housing 4. In each pair, two magnets 5 face each other in the radial direction of the yoke housing 4. A rotatable armature 6 is arranged at the inner side of the two pairs of magnets 5. A cylindrical rotation shaft 7, which forms part of the armature 6, includes a basal portion supported by a bearing 8, which is arranged at a central part of the closed end of the yoke housing 4. The rotation shaft 7 includes a distal portion projecting out of the yoke housing 4 through an open end 4*a*. A spiral worm 7*a* is formed in the distal portion of the rotation shaft 7. A gear housing 10, which forms the deceleration unit 3, is coupled to the open end 4*a* of the yoke housing 4 to accommodate the distal portion of the rotation shaft 7.

The deceleration unit 3 includes a deceleration mechanism 13, which decelerates the rotation of the rotation shaft 7. The deceleration mechanism 13 is accommodated in the gear housing 10. The gear housing 10 is hollow and includes a first housing 11, which is formed from a conductive metal material such as aluminum alloy, and a second housing 12, which is formed from an insulating resin material and coupled to the first housing 11.

Figure 5:
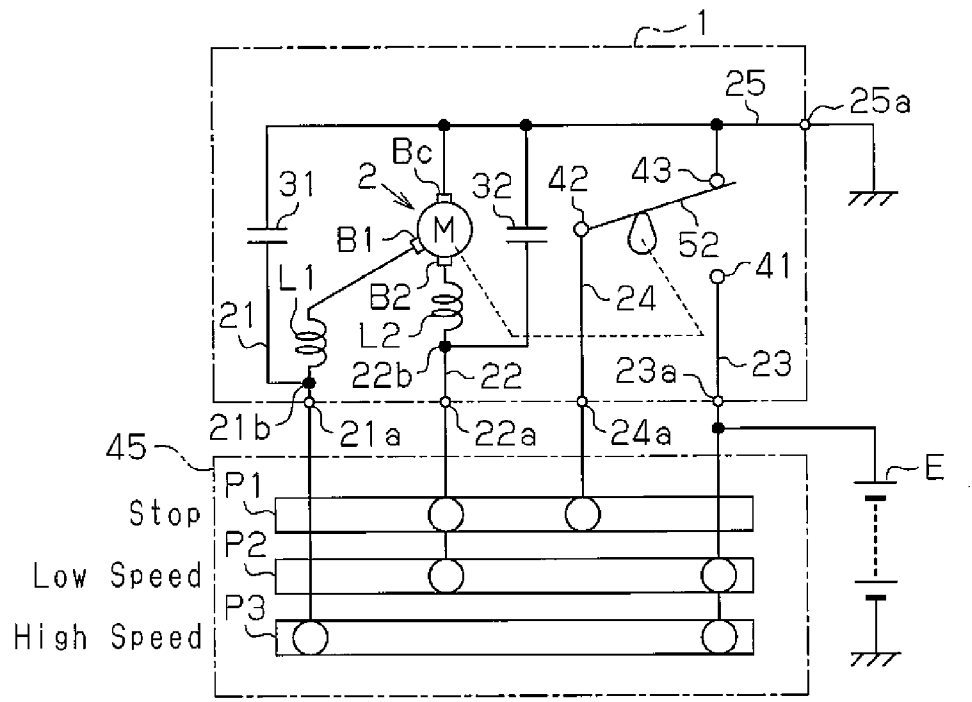
FIG. 5 is a schematic electrical diagram of a vehicle wiper device.

The first housing 11 includes a cylindrical coupling portion 11*a*, which is fixed to the open end 4*a* of the yoke housing 4 and has a closed end, and a generally plate-shaped accommodating portion 11*b*, which is formed integrally with the coupling portion 11*a*. The coupling portion 11*a* includes an open end 11*c*, which has substantially the same shape as the open end 4*a* of the yoke housing 4. The distal portion of the rotation shaft 7 (i.e., worm 7*a*) is inserted into the first housing 11 from the open end 11*c* and through the closed end of the coupling portion 11*a* for arrangement in the accommodating portion 11*b*. A bearing (not shown), which supports the rotation shaft 7 with the bearing 8, is arranged in the closed end of the coupling portion 11*a*. A brush device (not shown), which supplies power to the armature 6, is accommodated and fixed in the coupling portion 11*a*. The brush device forms part of the motor unit 2. As shown in FIG. 5, the brush device includes a high-speed power supply brush B1, a low-speed power supply brush B2, and a common brush Bc. The high-speed power supply brush B1 and the low-speed power supply brush B2 are used to supply power to the armature 6. The common brush Bc is commonly used when supplying power to the armature 6 with the high-speed power supply brush B1 and when supplying power to the armature 6 with the low-speed power supply brush B2.

Figures 2A, 2B:
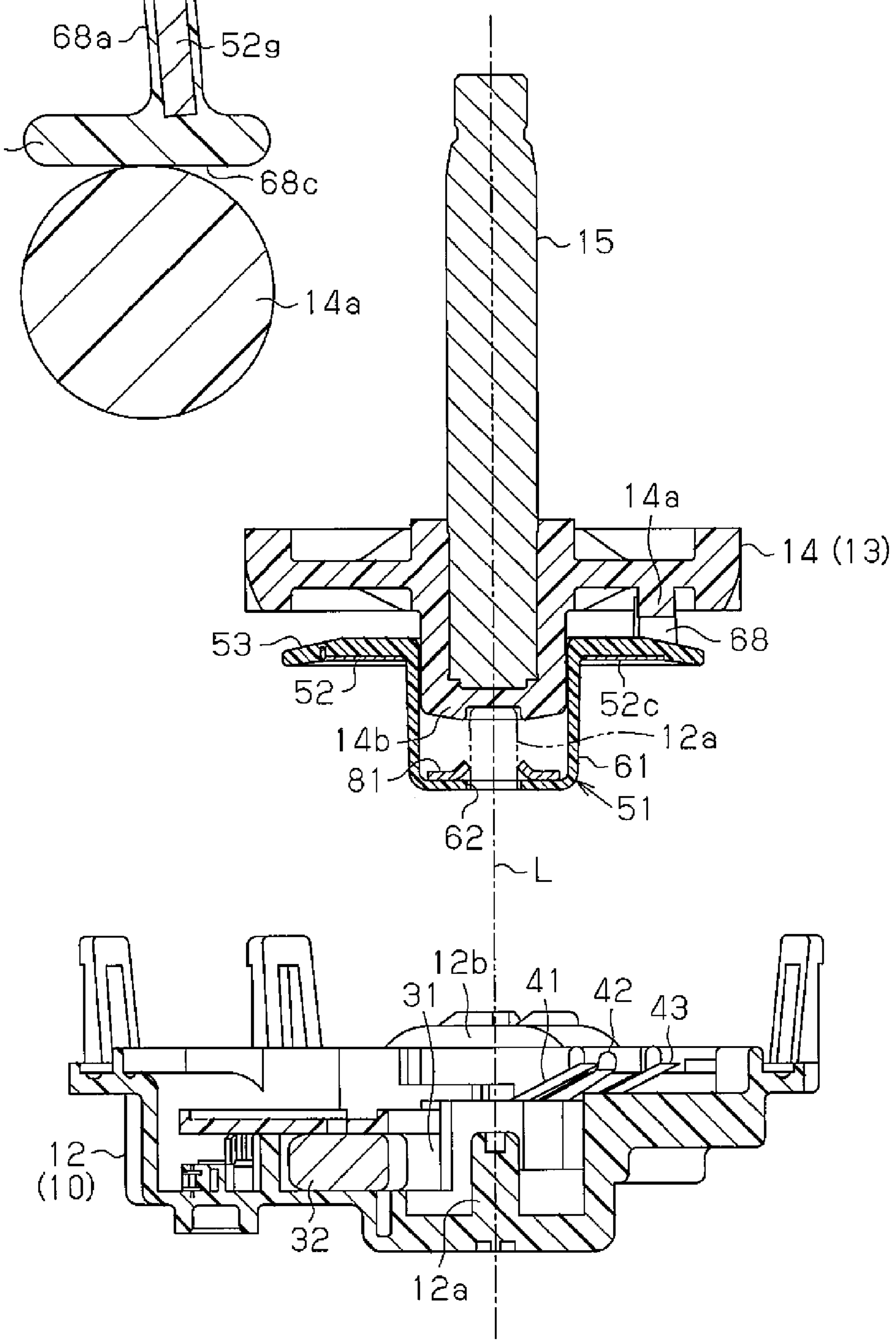
FIG. 2A is a cross-sectional view of a second housing, a worm wheel, an output shaft, and a rotation plate of FIG. 1 (second housing is shown in cross-section along line II-II in FIG. 4)
FIG. 2B is a cross-sectional view of a gear engagement projection and a plate engagement projection in engagement with each other.
Figure 3:
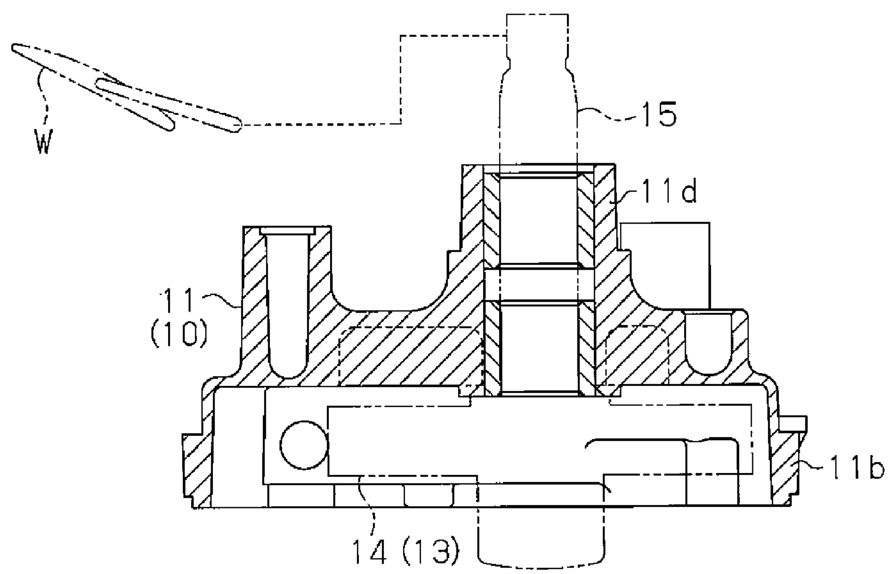
FIG. 3 is a cross-sectional view of a first housing of FIG. 1.

As shown in FIG. 1, the accommodating portion 11*b* accommodates a worm wheel 14, which serves as a rotating body forming the deceleration mechanism 13 with the worm 7*a*. The worm wheel 14 is a circular plate and mated with the worm 7*a*. As shown in FIG. 2A, a gear engagement projection 14*a*, which serves as a rotating body engagement projection projecting outward in an axial direction from the worm wheel 14 (towards a rotation plate 51, which will be described later), is formed in the axial end of the worm wheel 14 that is closer to the second housing 12. The gear engagement projection 14*a* is cylindrical and located outward in the radial direction from a central part of the worm wheel 14. The central part of the worm wheel 14 forms a fixed portion 14*b* that is cylindrical and has a closed end. A basal part of a cylindrical output shaft 15 is fixed in a relatively non-rotatable manner to the fixed portion 14*b*. As shown in FIG. 3, the output shaft 15 includes a distal part extending through the bottom of the accommodating portion 11*b* and projected out of the gear housing 10. The bottom of the accommodating portion 11*b* supports the output shaft 15. Specifically, the bottom of the accommodating portion 11*b* includes a tubular support 11*d* projecting out of the gear housing 10. The output shaft 15 is supported by the tubular support 11*d*. The output shaft 15 includes a distal portion coupled by a link mechanism (not shown) of the vehicle wiper device to a wiper W. The output shaft 15 drives the wiper W.

Figure 4:
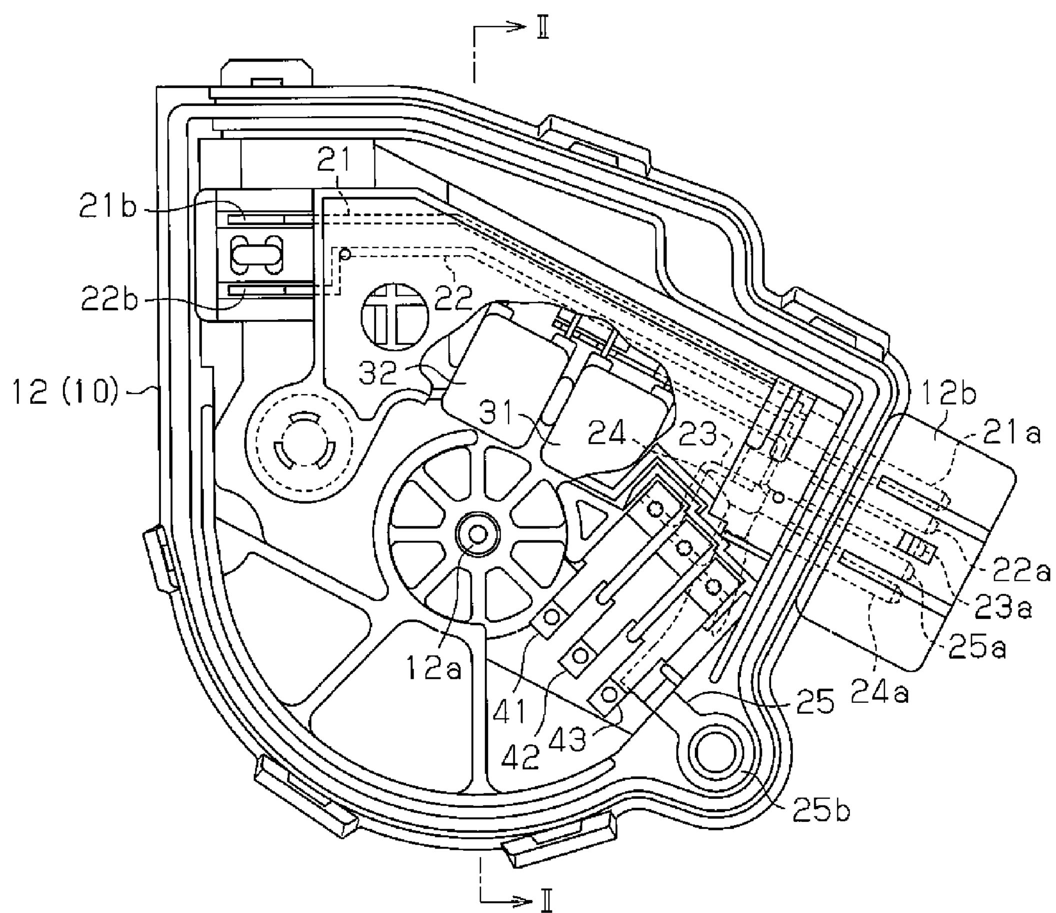
FIG. 4 is a plan view showing the second housing of FIG. 1.

As shown in FIG. 1, the second housing 12, which is generally plate-shaped in correspondence with the opening of the accommodating portion 11*b*, closes the opening of the accommodating portion 11*b* and is fixed to the first housing 11. As shown in FIGS. 2A and 4, an inner central part of the second housing 12 includes a cylindrical support projection 12*a* projecting into the gear housing 10 in the axial direction of the output shaft 15.

The second housing 12 includes a tubular connector 12*b* projecting out of the gear housing 10. Referring to FIGS. 4 and 5, the second housing 12 includes a plurality of (five in the present embodiment) terminal members 21 to 25. Each of the terminal members 21 to 25 punched out of a conductive metal plate into a predetermined shape and then bent at a plurality of locations. The terminal members 21 to 25 are insert-molded and partially embedded in the second housing 12.

The uppermost one of the five terminal members 21 to 25 as viewed in FIG. 4, namely, the first terminal member 21 is strip-shaped and bent at a number of locations. The second terminal member 22 is arranged next to the first terminal member 21 and located closer to the middle of the second housing 12 than the first terminal member 21. The first terminal member 21 includes one longitudinal end that defines a first connection terminal 21*a* projecting into the connector 12*b* and exposed from the gear housing 10 and another longitudinal end that defines a motor connection terminal 21*b* projecting out of the second housing 12 and into the gear housing 10. Further, the second terminal member 22 includes one longitudinal end that defines a second connection terminal 22*a* projecting into the connector 12*b* and exposed from the gear housing 10 and another longitudinal end that defines a motor connection terminal 22*b* projecting out of the second housing 12 and into the gear housing 10. The first motor connection terminal 21*b* is connected to the high-speed power supply brush B1 of the motor unit 2 by a choke coil L1. The second motor connection terminal 22*b* is connected to the low-speed power supply brush B2 of the motor unit 2 by a choke coil L2. A first anti-noise capacitor 31, which is arranged on the inner surface of the second housing 12, includes a first terminal connected to the first terminal member 21. A second anti-noise capacitor 32, which is arranged on the inner surface of the second housing 12, includes a first terminal connected to the second terminal member 22.

In the second housing 12, a third terminal member 23 is located in the proximity of the connector 12*b*. In the second housing 12, a fourth terminal member 24 is located in the proximity of the third terminal member 23. The third and fourth terminal members 23 and 24 respectively include ends defining third and fourth connection terminals 23*a* and 24*a* projecting into the connector 12*b* and exposed from the gear housing 10. The ends of the third and fourth terminal members 23 and 24 opposite to the third and fourth connection terminals 23*a* and 24*a* define first and second fixed contact terminals 41 and 42 fixed to the inner surface of the second housing 12.

In the second housing 12, a fifth terminal member 25 is located in the proximity of the connector 12*b*. The fifth terminal member 25 includes a fifth connection terminal 25*a* projecting into the connector 12*b* and exposed from the gear housing 10. A third fixed contact terminal 43, which is fixed to the inner surface of the second housing 12, is connected to the fifth terminal member 25. The first fixed contact terminal 41, the second fixed contact terminal 42, and the third fixed contact terminal 43 function as fixed terminals. Further, the fifth terminal member 25 includes a ground terminal 25*b* held between the outer edge of the first housing 11 and the outer edge of the second housing 12. A screw (not shown) fastens the first housing 11 and the second housing 12 to each other. The first and second anti-noise capacitors 31 and 32 each include a second terminal connected to the fifth terminal member 25.

An external connector (not shown) is connected to the connector 12*b*. The external connector and the first to fifth terminal members 21 to 25 supply power to the motor unit 2. Specifically, the external connector connects the first to fourth connection terminals 21*a* to 24*a* to a wiper switch 45, which is arranged near a driver seat in the vehicle. The third connection terminal 23*a* is connected to a positive terminal of a battery power supply E for the vehicle, and the fifth connection terminal 25*a* is connected to ground.

As shown in FIGS. 2A and 4, each of the fixed contact terminals 41 to 43 is strip-shaped, bent at a number of locations, and include a basal portion fixed to the inner surface of the second housing 12. The three fixed contact terminals 41 to 43 are arranged in parallel to one another. Further, each of the fixed contact terminals 41 to 43 includes a distal portion that is farther from the inner surface of the second housing 12 and closer to the worm wheel 14 than the basal end. The distal portion of each fixed contact terminal 41 to 43 overlaps the worm wheel 14 in the axial direction. Further, the distal portions of the fixed contact terminals 41 to 43 lie along a line extending in the radial direction of the worm wheel 14.

Figure 7:
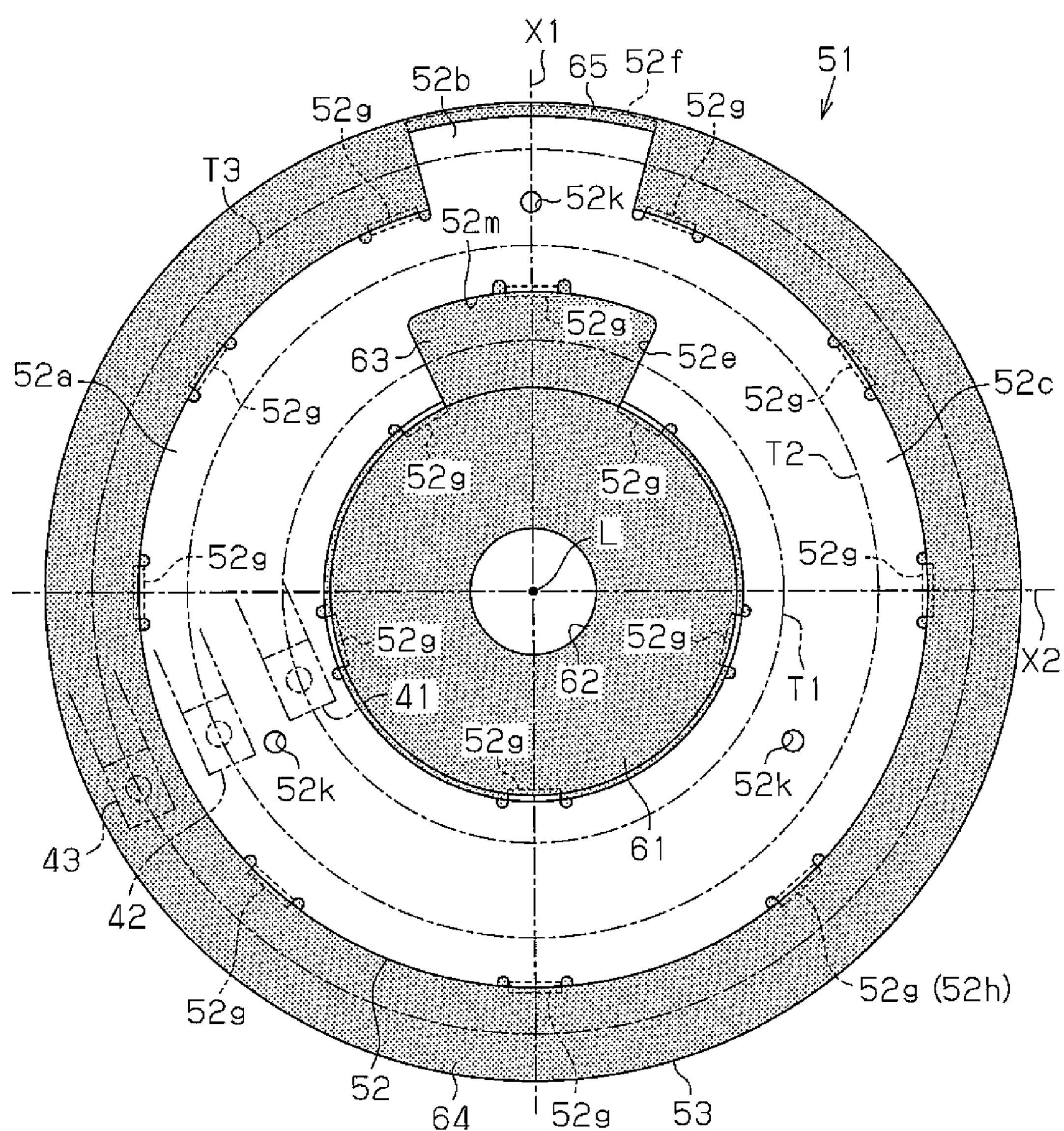
FIG. 7 is a front view showing the rotation plate of FIG. 2A.
Figure 8:
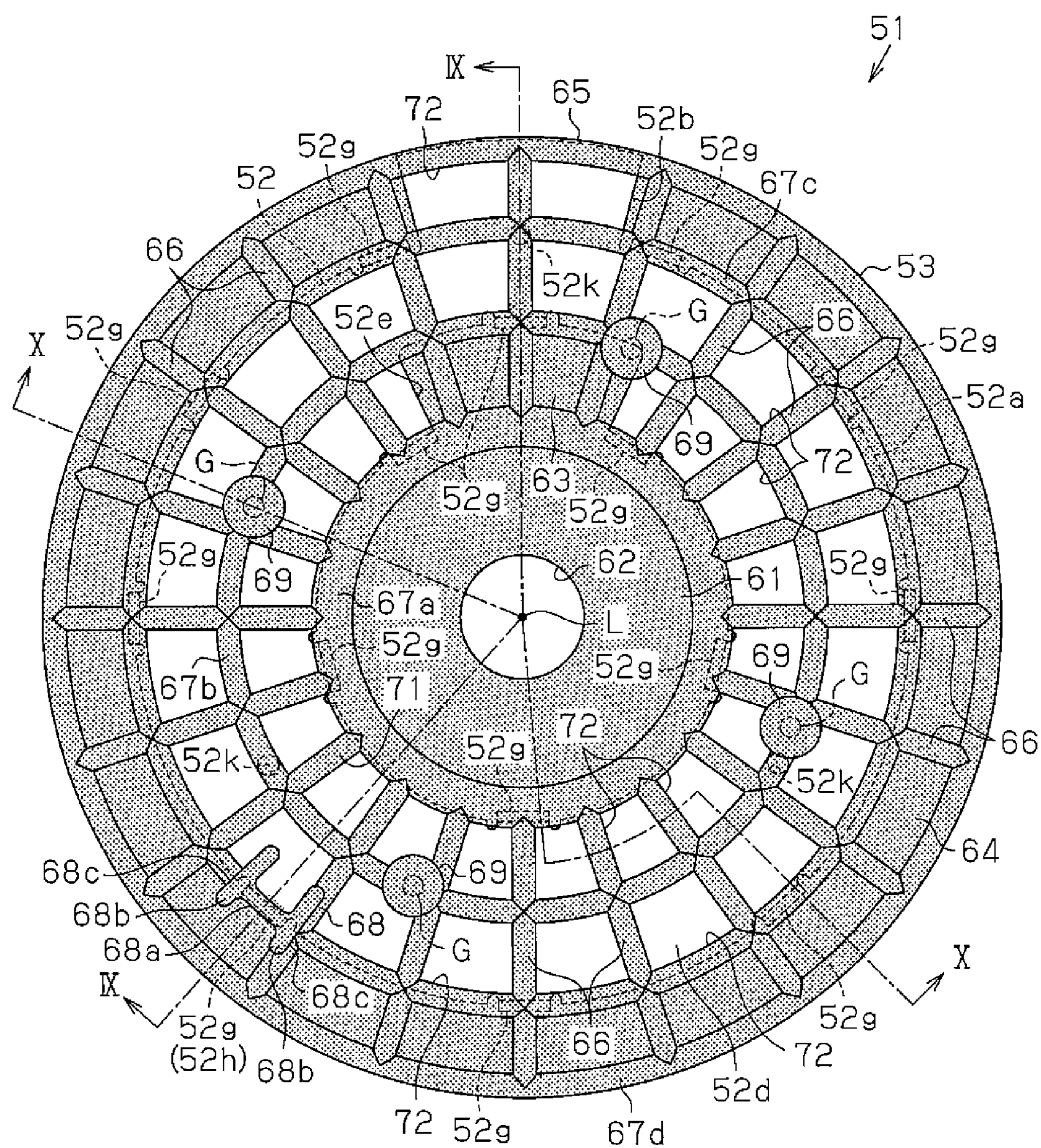
FIG. 8 is a rear view showing the rotation plate of FIG. 2A.

As shown in FIG. 2A, the gear housing 10 accommodates the rotation plate 51, which rotates together with the gear housing 10. The rotation plate 51 includes a movable contact plate 52 and a holding member 53, which is formed integrally with the movable contact plate 52. In FIGS. 7 and 8, the holding member 53 is indicated by fine dots to facilitate understanding of the shapes of the movable contact plate 52 and the holding member 53.

As shown in FIG. 7, the movable contact plate 52 is punched out of a conductive metal plate into a predetermined shape and then bent at a number of locations. The movable contact plate 52 includes a planar annular first contact portion 52*a*, and a planar triangular second contact portion 52*b* extending outward in the radial direction from the first contact portion 52*a*. The first contact portion 52*a* and the second contact portion 52*b* form a conductive pattern in the rotation plate 51. The movable contact plate 52 includes a first surface in a thicknesswise direction (i.e., surface including a first surface of the first contact portion 52*a* in a thicknesswise direction and a first surface of the second contact portion 52*b* in a thicknesswise direction) that functions as a slide contact surface 52*c*. The fixed contact terminals 41 to 43 slide in contact with the slide contact surface 52*c*. The slide contact surface 52*c* is flat and faces the fixed contact terminals 41 to 43. The movable contact plate 52 includes a second surface in the thicknesswise direction (i.e., surface including a second surface in the thicknesswise direction of the first contact portion 52*a* and a second surface of the second contact portion 52*b* in the thickness direction) that defines a flat holding surface 52*d* having a planar shape and located on the opposite side of the slide contact surface 52*c*.

The first contact portion 52*a* includes a non-conducting recess 52*e* that is recessed outward in the radial direction and opens inward in the radial direction. The two circumferential side surfaces defining the non-conducting recess 52*e* extends in the radial direction of the first contact portion 52*a*, and a bottom surface 52*m* of the non-conducting recess 52*e* is arcuate and concentric with the first contact portion 52*a*. Thus, the non-conducting recess 52*e* is triangular as viewed from the axial direction of the first contact portion 52*a* (i.e., the direction in which the axis L of the rotation plate 51 extends). The two circumferential side surfaces and the bottom surface of the non-conducting recess 52*e* form an inner circumferential edge of the first contact portion 52*a*.

Figure 9:
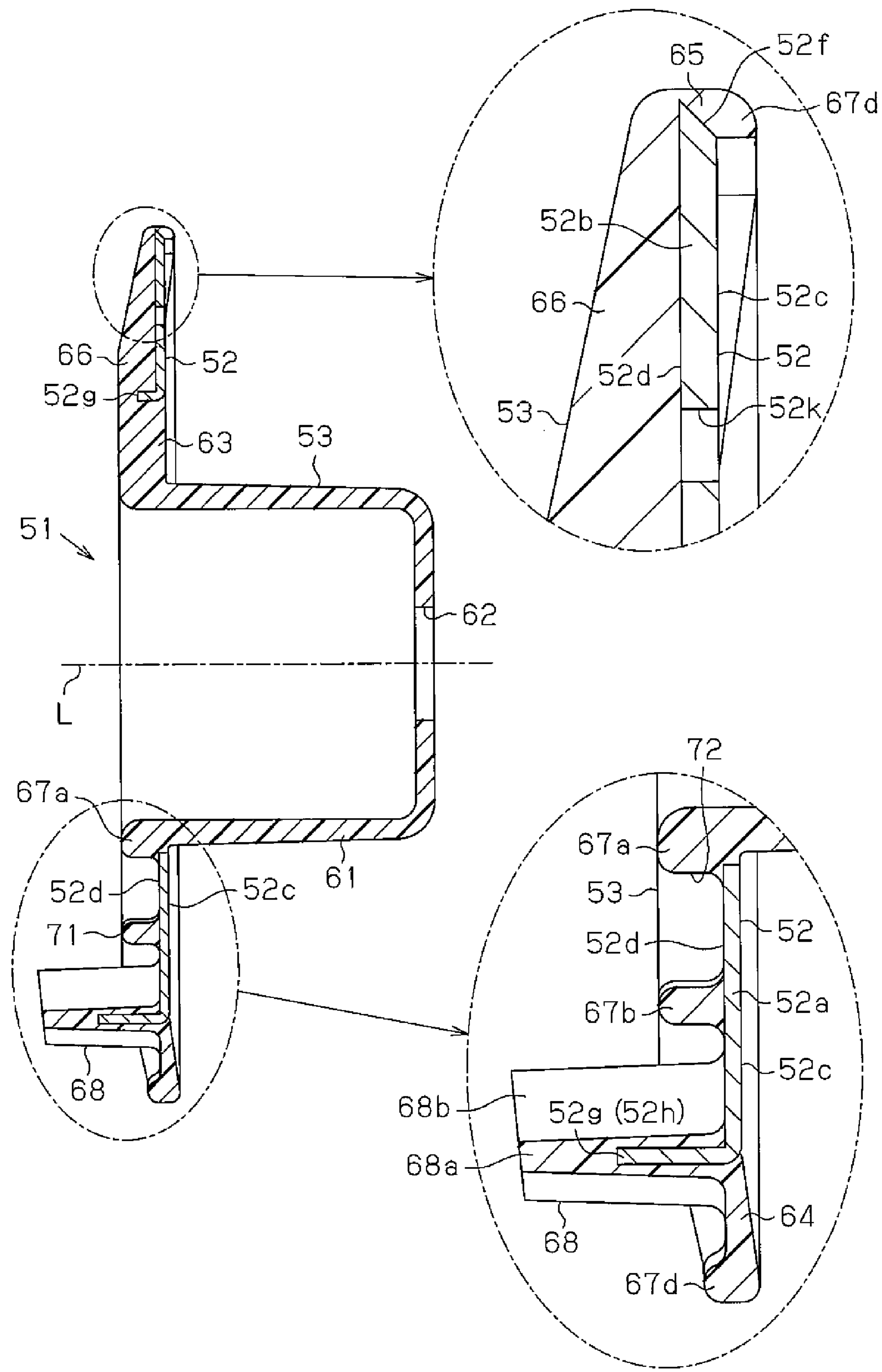
FIG. 9 is a cross-sectional view of the rotation plate taken along line IX-IX in FIG. 8.

The second contact portion 52*b* extends outward in the radially direction from a radially outward side of the non-conducting recess 52*e* in the first contact portion 52*a*. The two circumferential side surfaces of the second contact portion 52*b* extend in the radial direction of the first contact portion 52*a*, and a distal end of the second contact portion 52*b* is arcuate and concentric with the first contact portion 52*a*. A distal portion (outer side in the radial direction) of the second contact portion 52*b* includes a chamfer 52*f*. As shown in FIGS. 7 and 9, the chamfer 52*f* is formed by chamfering the corner of the second contact portion 52*b* located on the side of the slide contact surface 52*c*. The chamfer 52*f* continuously extends from one circumferential end to the other circumferential end.

As shown in FIG. 7, the movable contact plate 52 includes a plurality of (fifteen in the present embodiment) hooks 52*g*. Nine hooks 52*g* are arranged on the outer circumferential edge of the first contact portion 52*a*, and six hooks 52*g* are arranged on the inner circumferential edge of the first contact portion 52*a*. Here, a straight line extending through the circumferentially central part of the second contact portion 52*b* in the radial direction of the first contact portion 52*a* defines a first center line X1. Further, a straight line that is orthogonal to the first center line X1 and extends through the radially central part of the first contact portion 52*a* defines a second center line X2.

Two of the nine hooks 52*g* arranged on the outer circumferential edge of the first contact portion 52*a* are located next to the basal portion of the second contact portion 52*b* at opposite sides in the circumferential direction of the second contact portion 52*b*. Another two of the nine hooks 52*g* arranged on the outer circumferential edge of the first contact portion 52*a* are located along the second center line X2. Two more of the nine hooks 52*g* arranged on the outer circumferential edge of the first contact portion 52*a* are located at symmetric positions with respect to the first center line X1 at a central position in the circumferential direction between the hooks 52*g* located next to the basal portion of the second contact portion 52*b* and the hooks 52*g* arranged on the second center line X2. A further one of the nine hooks 52*g* arranged on the outer circumferential edge of the first contact portion 52*a* is located on the outer circumferential edge of the first contact portion 52*a* along the first center line X1 opposite to the second contact portion 52*b*. This hook 52*g* is separated by 180° from the second contact portion 52*b*. The remaining two of the nine hooks 52*g* arranged on the outer circumferential edge of the first contact portion 52*a* are located at symmetric positions with respect to the first center line X1 at a central position in the circumferential direction between the hooks 52*g* arranged on the second center line X2 and the hook 52*g* arranged on the first center line X1.

One of the six hooks 52*g* arranged on the inner circumferential edge of the first contact portion 52*a* is located on the bottom surface 52*m* of the non-conducting recess 52*e*. This hook 52*g* is located at a central part in the circumferential direction of the non-conducting recess 52*e* along the first center line X1. Another two of the six hooks 52*g* arranged on the inner circumferential edge of the first contact portion 52*a* are located next to the opening of the non-conducting recess 52*e* at opposite sides in the circumferential direction of the non-conducting recess 52*e*. Another one of the six hooks 52*g* arranged on the inner circumferential edge of the first contact portion 52*a* is located on the inner circumferential edge of the first contact portion 52*a* along the first center line X1 opposite to the non-conducting recess 52*e*. This hook 52*g* is separated by 180° from the non-conducting recess 52*e*. The remaining two of the six hooks 52*g* arranged on the inner circumferential edge of the first contact portion 52*a* are located at symmetric positions with respect to the first center line X1 at a central position in the circumferential direction between the hooks 52*g* arranged next to the opening of the non-conducting recess 52*e* and the hook 52*g* arranged on the first center line X1.

Figure 6A:
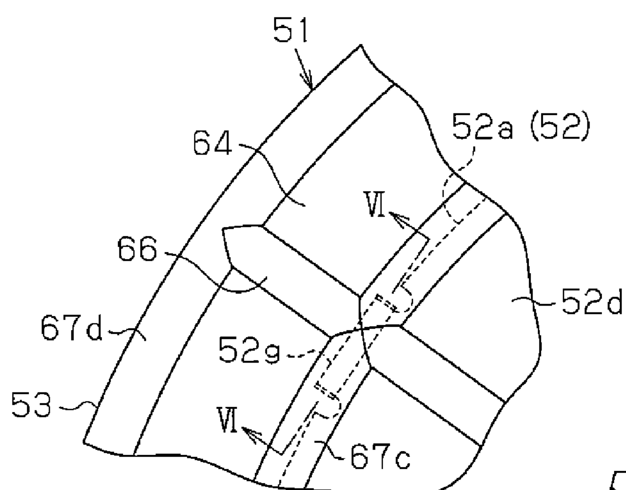
FIG. 6A is a partially enlarged view of the rotation plate.
Figure 6B:
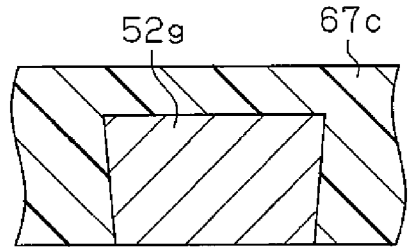
FIG. 6B is a cross-sectional view of the rotation plate taken along line VI-VI in FIG. 6A.
Figure 10:
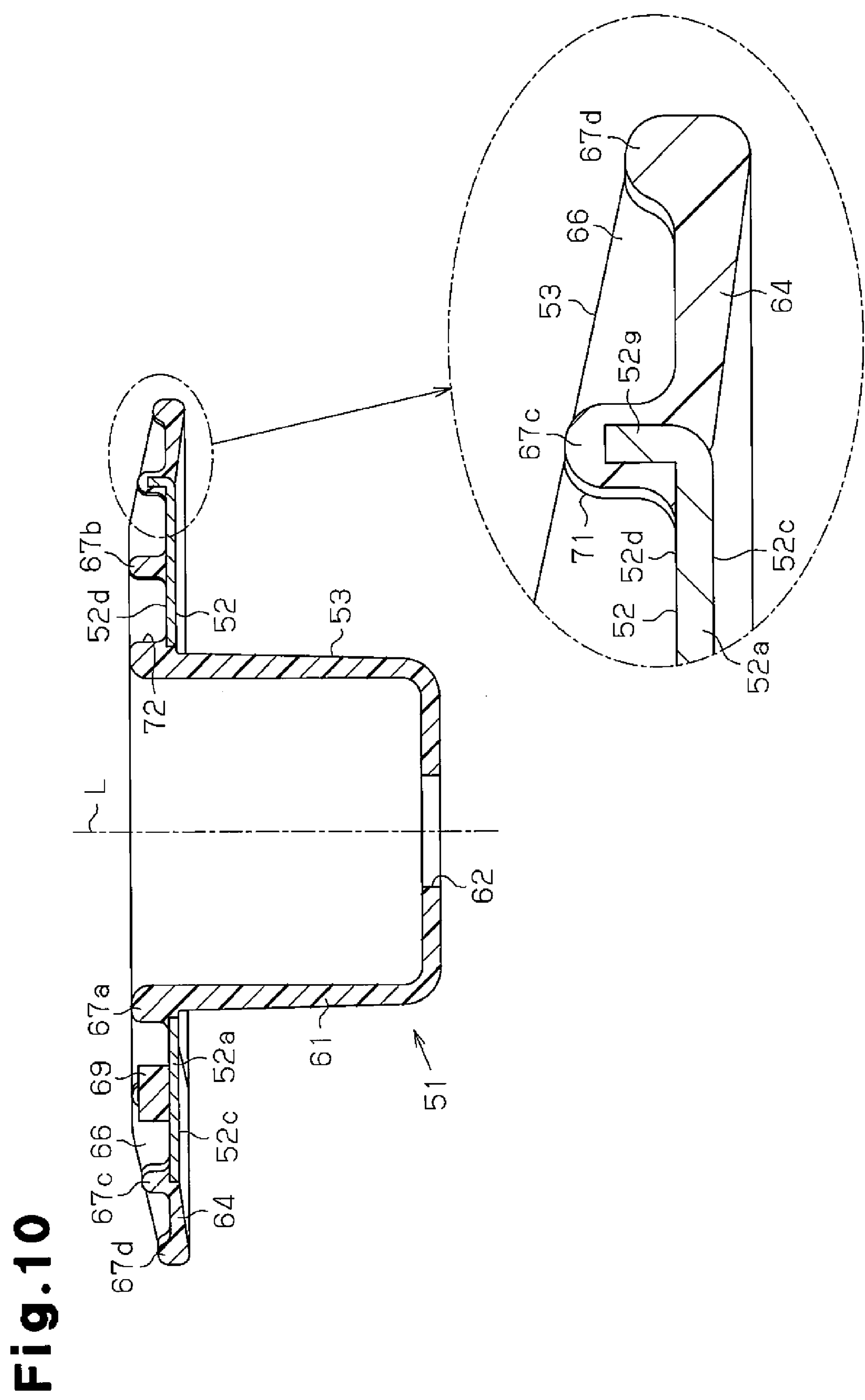
FIG. 10 is a cross-sectional view of the rotation plate taken along line X-X in FIG. 8.

As shown in FIGS. 9 and 10, the hooks 52*g* are bent at a right angle from the first contact portion 52*a* toward the holding surface 52*d*. As shown in FIGS. 6A and 6B, each hook 52*g* has a width (width in circumferential direction of the present embodiment, that is, width in rotating direction of the rotation plate 51) that increase from the basal end towards the distal end. Thus, each hook 52*g* of the present embodiment is trapezoidal. As shown in FIG. 9, one hook of the nine hooks 52*g* arranged on the outer circumferential edge of the first contact portion 52*a*, namely, the lower right hook 52*g* as viewed in FIG. 7, serves a projection hook 52*h* that is longer between the basal end and the distal end than the other fourteen hooks 52*g*. In other words, the projection hook 52*g* is longer in the direction of the axis L than the other fourteen hooks 52*g*.

As shown in FIG. 7, the movable contact plate 52 includes a plurality of (three in the present embodiment) positioning holes 52*k*. The positioning hole 52*k* receive protrusions formed in a mold (not shown) used to form the holding member 53. The movable contact plate 52 is positioned relative to the molding die by fitting the protrusions to the positioning holes 52*k* of the movable contact plate 52. The three positioning holes 52*k* are arranged at equal angular intervals (120° intervals in the present embodiment) in the circumferential direction in the movable contact plate 52 and extend through the movable contact plate 52 in the thicknesswise direction. One of the three positioning holes 52*k* is formed in the basal portion of the second contact portion 52*b*. The two remaining positioning holes 52*k* are formed in the first contact portion 52*a*. The positioning hole 52*k* formed in the basal portion of the second contact portion 52*b* is farther from the radially middle part of the first contact portion 52*a* than the other two second contact portions 52*b*. Each positioning hole 52*k* is located where the fixed contact terminals 41 to 43 do not come into contact with the movable contact plate 52.

The holding member 53, which holds the movable contact plate 52, is formed from an insulating resin material. The holding member 53 includes an engagement portion 61, which is arranged at the inner side of the first contact portion 52*a*, that is, at the central part of the rotation plate 51 in the radial direction. As shown in FIG. 10, the engagement portion 61 is cylindrical, has a closed end, is open toward the holding surface 52*d*, and projects out of the slide contact surface 52*c*. Referring to FIG. 2A, the engagement portion 61 has a slightly larger inner diameter than the outer diameter of the fixed portion 14*b*. An insertion hole 62 is formed in the middle of the bottom of the engagement portion 61. The insertion hole 62 extends through the bottom of the engagement portion 61 in the direction of the axis L of the rotation plate 51 and has the shape of a circle when viewed from the direction of the axis L. The insertion hole 62 has a slightly larger diameter than the outer diameter of the support projection 12*a* of the second housing 12.

As shown in FIGS. 7 and 8, the holding member 53 includes a non-conducting portion 63 extending outward in the radial direction from the opening of the engagement portion 61 and filling the non-conducting recess 52*e*. The non-conducting portion 63 is flat and slightly thicker than the thickness of the first contact portion 52*a*. The non-conducting portion 63 projects slightly from opposite sides of the first contact portion 52*a* in the axial direction. Thus, the slide contact surface 52*c* and the holding surface 52*d* are arranged within the range of the thickness of the non-conducting portion 63 in the direction of the axis L (between the two end faces in the axial direction of the non-conducting portion 63). The end face located at the side of the slide contact surface 52*c* (i.e., front surface of the rotation plate 51) in the non-conducting portion 63 is flat.

The holding member 53 includes an arcuate outer circumference holding portion 64, which surrounds the outer circumference of the first contact portion 52*a*. The outer circumference holding portion 64 extends continuously along the outer circumferential edge of the first contact portion 52*a* from one circumferential end to the other circumferential end of the second contact portion 52*b*. Further, the outer circumference holding portion 64 is located outward in the radial direction from the first contact portion 52*a*. The outer circumference holding portion 64 is arcuate and concentric with the first contact portion 52*a*. The outer circumference holding portion 64 is formed integrally with the first contact portion 52*a*. Thus, the outer circumference holding portion 64 is immovable relative to the first contact portion 52*a* in the rotating direction (circumferential direction) and the axial direction of the rotation plate 51. The outer circumference holding portion 64 has a slightly larger radial width than the second contact portion 52*b*. As shown in FIG. 10, the outer circumference holding portion 64 includes an end face at the side of the slide contact surface 52*c* (i.e., front surface of the rotation plate 51) that is located closer to the bottom of the engagement portion 61 than the slide contact surface 52*c*. The end face does not include ridges and valleys. Thus, in the present embodiment, at the front surface of the rotation plate 51 that comes into contact with the fixed contact terminals 41 to 43, the surface of the holding member 53 (i.e., end face of the non-conducting portion 63 located at the side of the slide contact surface 52*c* and end face of the outer circumference holding portion 64 located at the slide contact surface 52*c*) projects outward from the slide contact surface 52*c*, which is the front surface of the movable contact plate 52. Further, the end face of the outer circumference holding portion 64 located at the side of the holding surface 52*d* is located at generally the same position in the direction of the axis L as the holding surface 52*d*. As shown in FIG. 7, the outer circumference holding portion 64 forms an insulating pattern in the rotation plate 51 with the non-conducting portion 63. The first fixed contact terminal 41 slides in contact with the exposed surface (front surface) of the non-conducting portion 63 at the side of the slide contact surface 52*c*, and the third fixed contact terminal 43 slides in contact with the exposed surface (front surface) of the outer circumference holding portion 64 at the side of the slide contact surface 52*c*.

The holding member 53 includes a distal end covering portion 65, which covers the distal end of the second contact portion 52*b* at the radially outer side of the second contact portion 52*b*. The distal end covering portion 65 is arcuate (i.e., similar to the radially outer side of the outer circumference holding portion 64) and extends in the circumferential direction along the distal end of the second contact portion 52*b* along the radially outer side of the second contact portion 52*b*. The distal end covering portion 65 is formed integrally with the outer circumference holding portion 64 and couples the two circumferential ends of the outer circumference holding portion 64. Further, as shown in FIG. 9, the distal end covering portion 65 covers the distal end of the second contact portion 52*b* from the holding surface 52*d* to the slide contact surface 52*c*. In the present embodiment, the distal end covering portion 65 covers the chamfer 52*f* at the side of the slide contact surface 52*c*. The distal end covering portion 65 is also formed integrally with the distal end of the second contact portion 52*b* so as to be relatively immovable in the rotating direction and axial direction of the rotation plate 51.

As shown in FIG. 8, the holding member 53 includes a plurality of (twenty in the present embodiment) radial ribs 66 extending radially on the holding surface 52*d* about the center of rotation (i.e., axis L) of the rotation plate 51. The plurality of radial ribs 66 are formed at equal angular intervals (18° intervals in the present embodiment) in the circumferential direction and extend straight in the radial direction of the rotation plate 51. Each radial rib 66 extends from the inner circumferential edge of the first contact portion 52*a* (or radially inner end of the non-conducting portion 63) via the holding surface 52*d* to the outer circumference holding portion 64 (or distal end covering portion 65). Each radial rib 66 is formed integrally with the holding surface 52*d* (formed to be relatively immovable in the rotating direction and the axial direction of the rotation plate 51) and formed integrally formed with the outer circumference holding portion 64 (or distal end covering portion 65). As shown in FIG. 9, the part of each radial rib 66 inward from the central part in the radial direction has a greater height in the direction of the axis L than the hooks 52*g* (excluding the hook 52*h*). The part of each radial rib 66 outward in the radial direction from the central part has a height that decreases in the direction of the axis L towards the radially outer side.

As shown in FIG. 8, the holding member 53 includes four arcuate ribs, namely, a first arcuate rib 67*a*, a second arcuate rib 67*b*, a third arcuate rib 67*c*, and a fourth arcuate rib 67*d*, formed on the side of the holding surface 52*d* of the rotation plate 51.

The first arcuate rib 67*a* extends in the circumferential direction along the inner circumferential edge of the first contact portion 52*a*. The first arcuate rib 67*a* couples the radially inner ends of the radial ribs 66 that are adjacent in the circumferential direction. Further, the first arcuate rib 67*a* is ring-shaped (arcuate) and has a center that lies along the axis L. As shown in FIG. 10, the first arcuate rib 67*a* is formed integrally with the open end of the engagement portion 61 and projects outward from the holding surface 52*d* and away from the bottom of the engagement portion 61 along the direction of axis L. The height of the first arcuate rib 67*a* from the slide contact surface 52*c* in the direction of the axis L is greater than the height of the hooks 52*g* arranged on the inner circumferential edge of the first contact portion 52*a* (specifically, length between basal end and distal end of each hook 52*g*). Further, the radial width of the first arcuate rib 67*a* is greater than the thickness of the hooks 52*g*. The first arcuate rib 67*a* includes five hooks 52*g* embedded in the inner circumferential edge of the first contact portion 52*a*. Moreover, the radially inner end of the first contact portion 52*a* is embedded in and formed integrally with the first arcuate rib 67*a* (formed to be relatively immovable in the rotating direction and the width direction of the rotation plate 51).

As shown in FIG. 8, the second arcuate rib 67*b* is located outward in the radial direction from the first arcuate rib 67*a*. The second arcuate rib 67*b* extends along the circumferential direction through the middle part of the first contact portion 52*a* in the radial direction on the movable contact plate 52 in the holding member 53 at the side of the holding surface 52*d*. The second arcuate rib 67*b* couples the radial ribs 66 that are adjacent in the circumferential direction. The second arcuate rib 67*b* passes by the bottom surface 52*m* of the non-conducting recess 52*e* and two positioning holes 52*k* formed in the first contact portion 52*a*. The second arcuate rib 67*b* is also arcuate, and has a center that lies along the axis L, concentric with the first arcuate rib 67*a*, and formed integrally with the holding surface 52*d* to be relatively immovable with the first contact portion 52*a*. As shown in FIG. 10, the height of the second arcuate rib 67*b* in the direction of the axis L is equal to the height of the first arcuate rib 67*a* and slightly greater than the height of the hooks 52*g*. Moreover, as shown in FIG. 8, the radial width of the second arcuate rib 67*b* is greater than the thickness of the hooks 52*g*. The hook 52*g* formed at the bottom surface 52*m* of the non-conducting recess 52*e* is embedded in the second arcuate rib 67*b*.

The third arcuate rib 67*c* is located outward in the radial direction from the second arcuate rib 67*b*. The third arcuate rib 67*c* extends in the circumferential direction along the inner circumferential edge of the outer circumference holding portion 64 and the outer circumferential edge of the first contact portion 52*a* on the movable contact plate 52 at the side of the holding surface 52*d* of the holding member 53. The third arcuate rib 67*c* couples the radial ribs 66 that are adjacent in the circumferential direction. The third arcuate rib 67*c* passes by the positioning hole 52*k* formed at the basal end of the second contact portion 52*b*. The third arcuate rib 67*c* is also arcuate, has a center that lies along the axis L, and is formed to be concentric with the first arcuate rib 67*a* and the second arcuate rib 67*c*. The third arcuate rib 67*c* is formed integrally with the outer circumference holding portion 64 and integrally with the holding surface 52*d* to be relatively immovable with the first contact portion 52*a*. As shown in FIG. 10, the height of the third arcuate rib 67*c* in the direction of the axis L is slightly greater than the height of the hooks 52*g* and slightly less than the height of the first arcuate rib 67*a*. Moreover, referring to FIG. 8, the radial width of the third arcuate rib 67*c* is equal to the radial width of the second arcuate rib 67*b*. The nine hooks 52*g* formed at the outer circumferential edge of the first contact portion 52*a* are embedded in the third arcuate rib 67*c*.

The fourth arcuate rib 67*d* is formed outward in the radial direction from the third arcuate rib 67*c*. The fourth arcuate rib 67*d* extends in the circumferential direction along the outer circumferential edge part of the outer circumference holding portion 64 on the movable contact plate 52 in the holding member 53 at the side of the holding surface 52*d*. The fourth arcuate rib 67*d* couples the ends on of the radial ribs 66 that are adjacent in the circumferential direction. The fourth arcuate rib 67*d* is also formed on the distal end covering portion 65 and formed integrally with the outer circumference holding portion 64. The fourth arcuate rib 67*d* is arcuate, has a center this lies along the axis L, and is concentric with the first arcuate rib 67*a*, the second arcuate rib 67*c*, and the third arcuate rib 67*c*. As shown in FIG. 10, the height of the fourth arcuate rib 67*d* in the direction of the axis L is less than the height of the first arcuate rib 67*a*. The radial width of the fourth arcuate rib 67*d* is substantially equal to the radial width of the second arcuate rib 67*b*.

As shown in FIG. 8, the radial ribs 66 and the arcuate ribs 67*a* to 67*d* form a mesh structure on the movable contact plate 52 at the side of the holding surface 52*d* in the rotation plate 51 (specifically, holding member 53). The portion of the holding member 53 corresponding to the movable contact plate 52 defines a perforated portion 71 having a mesh structure formed by the radial ribs 66 and the first to fourth arcuate ribs 67*a* to 67*d*. The perforated portion 71 is formed on the holding surface 52*d* of the holding member 53. The perforated portion 71 includes a plurality of exposing holes 72, which exposes the holding surface 52*d* to the exterior, and formed by the mesh of the radial ribs 66 and the first to fourth arcuate ribs 67*a* to 67*d*.

As shown in FIGS. 2A and 8, the holding member 53 includes a plate engagement projection 68, which projects toward the worm wheel 14, which is arranged facing the holding surface 52*d*. That is, the plate engagement projection 68 projects toward the worm wheel 14 along the axis L from the holding surface 52*d* (side of worm wheel 14) of the rotation plate 51. The plate engagement projection 68 comes into contact with the gear engagement projection 14*a* from the circumferential direction to rotate the rotation plate 51 with the worm wheel 14. The plate engagement projection 68 is formed so that the distance between the plate engagement projection 68 and the axis L is equal to the distance between the rotation axis of the worm wheel 14, which coincides with the axis L, and the gear engagement projection 14*a* in the rotation plate 51.

As shown in FIGS. 2B, 8, and 9, the plate engagement projection 68 includes a coupling wall 68*a*, which projects from the third arcuate rib 67*c*, and two contact walls 68*b*, which are coupled by the coupling wall 68*a*. The coupling wall 68*a* is formed at a portion where a projection hook 52*h* is arranged. The coupling wall 68*a* is tetragonal and has a middle circumferential part with a thickness in a direction that coincides with the radial direction of the rotation plate 51. The thickness of the coupling wall 68*a* is substantially equal to the radial width of the third arcuate rib 67*c*, and the height of the coupling wall 68*a* in the direction of the axis L is greater than the height of the projection hook 52*h*. The coupling wall 68*a* embeds the projection hook 52*h*.

The two contact walls 68*b* are formed integrally with the circumferential ends of the coupling wall 68*a*. Each contact wall 68*b* is tetragonal and orthogonal to the rotating direction (circumferential direction) of the rotation plate 51. The middle part of each contact wall 68*b* in the radial direction of the rotation plate 51 is coupled to the coupling wall 68*a*. Thus, the plate engagement projection 68 is H-shaped as viewed from the direction of axis L. The surface of each contact wall 68*b* opposite to the coupling wall 68*a* defines a flat contact surface 68*c* that is parallel to the axis L and orthogonal to the rotating direction of the rotation plate 51. In other words, at a point where a circle of which center is the axis L intersects with the contact surface 68*c*, a normal line of the contact surface 68*c* coincides with a tangent line of the circle.

As shown in FIGS. 8 and 10, the holding member 53 includes a plurality of (four in the present embodiment) resin inlets 69 located on the side of the holding surface 52*d* of the rotation plate 51, that is, located in a part of the holding member 53 at a side corresponding the side of the holding surface 52*d* with respect to the movable contact plate 52. In other words, the plurality of resin inlets 69 is formed in the holding member 53 at a portion opposite to a portion facing the holding surface 52*d*. The four resin inlets 69 are formed at four locations at the side of the holding surface 52*d* and on the second arcuate rib 67*b*. The four resin inlets 69 are arranged at equal angular intervals (90° intervals in the present embodiment) in the circumferential direction and formed integrally with the second arcuate rib 67*b* and integrally with the holding surface 52*d*. Each resin inlet 69 has a circular shape as viewed from the direction of the axis L. When forming the holding member 53, the holding member 53 is set in a mold. The resin inlets 69 include gates G (illustrated by double-dashed lines in FIG. 8) through which molten resin is charged into the mold (not shown). Thus, when forming the holding member 53, the molten resin material is charged into the mold from the side of the holding surface 52*d* of the movable contact plate 52 arranged in the molding die, that is, the opposite side of the slide contact surface 52*c*.

As shown in FIG. 2A, the rotation plate 51 has a smaller outer diameter than the worm wheel 14. A teethed washer 81 is fastened to the support projection 12*a* in a state in which the slide contact surface 52*c* faces the second housing 12 and the support projection 12*a* is inserted in the insertion hole 62 of the engagement portion 61. This rotatably supports the rotation plate 51 with the support projection 12*a* of the second housing 12. The fixed portion 14*b* of the worm wheel 14 is fitted into the engagement portion 61 when coupling the second housing 12 to the first housing 11. The worm wheel 14 and the rotation plate 51 are rotated about the axis L, and the outer peripheral surface of the fixed portion 14*b* and the inner peripheral surface of the engagement portion 61 slide in contact with each other so that the worm wheel 14 and the rotation plate 51 are rotatable relative to each other. Further, the gear engagement projection 14*a* of the worm wheel 14 comes into contact from the circumferential direction with the plate engagement projection 68 of the rotation plate 51. As shown in FIG. 2B, in a state in which the gear engagement projection 14*a* comes into contact from the circumferential direction with the plate engagement projection 68, the gear engagement projection 14*a* is in linear contact with one of the contact surfaces 68*c* of the plate engagement projection 68. Referring to FIG. 2A, the rotational force of the worm wheel 14 is transmitted to the rotation plate 51 by the gear engagement projection 14*a* and the plate engagement projection 68.

The distal portions of the fixed contact terminals 41 to 43 are in contact with the surfaces at the side of the slide contact surface 52*c* (i.e., slide contact surface 52*c*, surface of the non-conducting portion 63 at the side of the slide contact surface 52*c*, and surface of the outer circumference holding portion 64 at the side of the slide contact surface 52*c*) of the rotation plate 51 in the gear housing 10. The elastic force of the fixed contact terminals 41 to 43 pushes the rotation plate 51 in the direction of the axis L causes contact of the fixed contact terminals 41 to 43 with the rotation plate 51 and pushes the rotation plate 51 with the elastic force. As shown in FIG. 7, the fixed contact terminal 41 contacts a first track T1, which is the portion closer to the inner circumference or the non-conducting portion 63, in accordance with the rotational position of the rotation plate 51. The second fixed contact terminal 42 contacts a second track T2, which is a portion that is outward in the radial direction from the non-conducting recess 52*e* in the first contact portion 52*a*. Further, the third fixed contact terminal 43 contacts a third track T3, which is the second contact portion 52*b* or the outer circumference holding portion 64 in accordance with the rotational position of the rotation plate 51. Accordingly, in accordance with the rotational position of the rotation plate 51, the movable contact plate 52 electrically switches the combination of the actuated fixed contact terminal 41 to 43 in accordance with the rotational position of the rotation plate 51. This performs switching or signal generation in accordance with the rotational position of the rotation plate 51.

As shown in FIG. 5, the wiper switch 45 can be shifted to a stop position P1 for stopping the motor 1 to stop the wiper W, a low speed operating position P2 for operating the motor 1 at a low speed so that the wiper W performs wiping at a low speed, and a high speed operating position P3 for operating the motor 1 so that the wiper W performs wiping at a high speed.

The operation of the motor 1 of the present embodiment will now be described.

When the wiper switch 45 is shifted to the stop position P1 in a state in which the wiper W is arranged at the stop position at the lower end of the windshield, power is not supplied from the battery power supply E to the first connection terminal 21*a* (first terminal member 21), which is connected to the high speed power supply brush B1 of the motor unit 2, and the second connection terminal 22*a* (second terminal member 22), which is connected to the low speed power supply brush B2. Accordingly, the armature 6 is not rotated in the motor unit 2, the wiper W thereby remains at the stop position.

When the wiper switch 45 is shifted to the low speed operating position P2, power is supplied from the battery power supply E to the low speed power supply brush B2 via the second connection terminal 22*a* (second terminal member 22) regardless of the state of contact state between the movable contact plate 52 of the rotation plate 51 and each of the fixed contact terminal 41 to 43. This drives and rotates the armature 6, and the rotation of the armature 6 is output from the output shaft 15 after being decelerated by the worm 7*a* and the worm wheel 14. The rotation of the output shaft 15 is transmitted through a link mechanism (not shown) to the wiper W, which performs wiping at a low speed.

When the wiper switch 45 is shifted to the stop position P1 during a wiping operation of the wiper W (i.e., when the wiper W is located at a position other than the stop position), the supply of power from the battery power supply E through the low speed operating position P2 of the wiper switch 45 is stopped. However, a power supply path extends to the low speed power supply brush B2 through the first fixed contact terminal 41, the movable contact plate 52, and the second fixed contact terminal 42. This continues driving the motor unit 2, that is, the wiping operation of the wiper W. When the wiper W moves to the stop position, the connection of the first fixed contact terminal 41 and the second fixed contact terminal 42 through the movable contact plate 52 is switched to connection of the first fixed contact terminal 41 and the third fixed contact terminal 43. This automatically stops driving the motor unit 2 and thereby stops the wiping operation of the wiper W.

When the wiper switch 45 is shifted to the high speed operating position P3, the power supplied from the battery power supply E to the high speed power supply brush B1 via the first connection terminal 21*a* (first terminal member 21) regardless of the state of contact between the movable contact plate 52 of the rotation plate 51 and each of the fixed contact terminals 41 to 43. This generates rotation with the motor unit 2, and the rotation is decelerated by the deceleration mechanism 13 and output from the output shaft 15. The wiper W performs wiping operation at a high speed with as the output shaft 15 rotates. During the high speed operation of the wiper W, when the wiper switch 45 is shifted to the stop position P1, in the same manner as described above, the rotation plate 51 and the fixed contact terminals 41 to 43 function to continuously supply power to the motor 1 until the wiper W reaches the stop position. The motor 1 is automatically stopped when the wiper W reaches the stop position.

In this manner, in the motor 1 of the first embodiment, the rotational position of the output shaft 15 (i.e., position of the wiper W) is detected by the contact positions of the three fixed contact terminals 41 to 43 relative to the rotation plate 51, which rotates together with the worm wheel 14. Further, power is supplied to the motor unit 2 in accordance with the detected rotational position (mode of power supply is changed). The rotation plate used to detect the rotational position of the output shaft 15 is formed by integrally molding the movable contact plate 52 and the holding member 53. Thus, the cost for forming the rotation plate can be reduced.

The present embodiment has the advantages described below.

(1) The holding member 53 is molded integrally with the movable contact plate 52. Thus, even when the movable contact plate 52 is formed in different shapes, as long as there are no changes in the outer dimensions of the rotation plate 51, different types of rotation plates 51 including movable contact plates 52 of different shapes can be formed by the same mold. Thus, there is no need to prepare different types of molds to form the holding member 53 in accordance with the type of movable contact plate 52. The movable contact plate 52 and the holding member 53 are fixed so that the front surface of the movable contact plate 52 does not project outward from the front surface of the holding member 53 at the same time when forming the holding member 53. Accordingly, the number of manufacturing steps can be reduced while preventing the steps from being formed by the movable contact plate 52 compared to when forming the holding member and the movable contact plate as separate bodies and then fixing the movable contact plate to the holding member. This reduces the costs for manufacturing the rotation plate 51, which, in turn, reduces the cost for manufacturing the motor 1 that includes the rotation plate 51.

(2) The amount of resin material used for the holding member 53 is reduced by arranging the perforated portion 71, which includes the exposing holes 72 in the holding member 53, compared to when covering the entire holding surface 52*d* with the resin material. This further reduces the manufacturing cost of the rotation plate 51 and decreases the weight of the rotation plate 51. Further, the reduction in the amount of resin material forming the holding member 53 by the perforated portion 71 decreases the contraction amount when the resin material solidifies. This suppresses deformation such as bending of the holding member 53 and prevents separation of the holding member 53 and the movable contact plate 52 from the rotation plate 51. Thus, the movable contact plate 52 is securely fixed by the holding member 53.

(3) The holding member 53 includes the radial ribs 66 and the first to fourth arcuate ribs 67*a* to 67*d*. The perforated portion 71, which has a mesh structure, is formed by the radial ribs 66 and the first to fourth arcuate ribs 67*a* to 67*d* at a location corresponding to the movable contact plate 52. Thus, the mesh structure has regularity in the shape and size of the exposing holes 72 formed by the radial ribs 66 and the first to fourth arcuate ribs 67*a* to 67*d*. Further, the amount of resin material forming the holding member 53 is reduced and the contraction amount when the resin material solidifies is further reduced. This further suppresses deformation such as bending of the holding member 53 and further prevents separation of the holding member 53 and the movable contact plate 52 from the rotation plate 51. Thus, the movable contact plate 52 is further securely fixed by the holding member 53.

(4) The hooks 52*g* prevent the first to fourth arcuate ribs 67*a* to 67*d* and the radial ribs 66, which are coupled by the arcuate ribs 67*a* to 67*d*, from moving in the radial direction relative to the movable contact plate 52 when the resin material of the holding member 53 contacts as it solidifies. This further suppresses bending of the rotation plate 51 and separation of the holding member 53 and the movable contact plate 52.

(5) Each hook 52*g* is formed to widen toward the distal end from the basal end so that the distal side of the hook 52*g* is easily hooked to the first to third arcuate ribs 67*a* to 67*c*. This prevents separation of the hooks 52*g* from the first to third arcuate ribs 67*a* to 67*c*, and the movable contact plate 52 is further rigidly fixed to the holding member 53.

(6) The projection hook 52*h*, which has a length from its basal end to its distal end that is greater than that of each hook 52*g* embedded in the third arcuate rib 67*c*, is embedded in the plate engagement projection 68 that engages with the gear engagement projection 14*a* of the worm wheel 14 in the rotating direction. This prevents the plate engagement projection 68 from being tilted by the contraction of the resin material of the holding member 53 when the resin material solidifies.

(7) The two contact walls 68*b* are each flat and orthogonal to the rotating direction of the rotation plate 51. Accordingly, even when the contraction of the resin material of the holding member 53 as the resin material produces force that acts to tilt the distal portion of the plate engagement projection 68 in an inward direction of the rotation plate 51, the contact wall 68*b* remains orthogonal to the rotating direction of the rotation plate 51. This keeps the two contact walls 68*b* at the same positions in the rotating direction of the rotation plate 51. Thus, displacement in the rotating direction of the rotation plate 51 and the worm wheel 14 when engaging the gear engagement projection 14*a* and the plate engagement projection 68 in the rotating direction of the rotation plate 51 is suppressed. Further, the projection hook 52*h* is embedded in the coupling wall 68*a* that couples the contact walls 68*b*. This easily flattens the contact wall 68*b* that comes into contact with the gear engagement projection 14*a* and further easily suppresses tilting of the plate engagement projection 68.

(8) The hooks 52*g* are formed at opposite circumferential sides of the basal part of the second contact portion 52*b* on the outer circumferential edge of the first contact portion 52*a* and at the radially inner side of the second contact portion 52*b* on the inner circumferential edge of the first contact portion 52*a*. The arrangement of the hooks 52*g* at the three locations effectively suppresses separation of the holding member 53 and the second contact portion 52*b*.

(9) The distal end covering portion 65 effectively suppresses separation of the holding member 53 and the second contact portion 52*b*.

(10) The formation of the chamfer 52*f* at the distal part of the second contact portion 52*b* covered by the distal end covering portion 65 effectively suppresses separation of the holding member 53 and the second contact portion 52*b*.

(11) The gates G used to charge molten resin into the mold, which forms the holding member 53, are arranged on the side of the holding surface 52*d*. Thus, the gates G do not form ridges and valleys The bumps formed by are not formed on the surface at the side of the slide contact surface 52*c* on which the fixed contact terminals 41 to 43 slide in the rotation plate 51. Accordingly, the fixed contact terminals 41 to 43 smoothly slide in contact with the surface at the side of the slide contact surface 52*c* in the rotation plate 51.

(12) The protrusions formed in the mold (not shown), which is used to form the holding member 53, are respectively fitted to each of the positioning holes 52*k* formed in the movable contact plate 52 to position the movable contact plate 52 in the mold. The positioning holes 52*k* are formed at locations that do not come into contact with the fixed contact terminals 41 to 43. This prevents intermittent contact of the fixed contact terminals 41 to 43 and the movable contact plate 52 when using the rotation plate 51.

It should be apparent to those skilled in the art that the present invention may be embodied in many other specific forms without departing from the spirit or scope of the invention. Particularly, it should be understood that the present invention may be embodied in the following forms.

In the embodiment described above, the motor 1 is used as the drive source for the vehicle wiper device. However, the motor 1 may be used as a drive source for a device other than the vehicle wiper device. For example, the motor 1 may be used as a drive source for a device that actuates a vehicle window regulator or as a drive source for a device that electrically opens and closes a vehicle sunroof.

In the embodiment described above, the resin inlet 69 is arranged at four areas on the second arcuate rib 67*b*. However, the resin inlet 69 merely needs to be formed at the side of the holding surface 52*d* relative to the movable contact plate 52 in the rotation plate 51. For instance, the resin inlet 69 may be arranged at three locations on the third arcuate rib 67*c* at the side of the holding surface 52*d* in the rotation plate 51.

In the embodiment described above, the chamfer 52*f* is formed in the distal part of the second contact portion 52*b*. However, the chamfer 52*f* does not necessarily have to be formed.

In the embodiment described above, the holding member 53 includes the distal end covering portion 65. However, the holding member 53 does not have to include the distal end covering portion 65 when separation of the second contact portion 52*b* and the holding member 53 does not occur.

In the embodiment described above, the movable contact plate 52 has a shape including a conductive pattern formed by the first contact portion 52*a*, which is annular, and the second contact portion 52*b*, which is triangular and projects outward in the radial direction from the first contact portion 52*a*. However, the shape of the movable contact plate 52 is not limited as described above and may be changed as required to form the conductive pattern in correspondence with the stop position of the wiper W, the wiping angle of the wiper W, and the like in the vehicle including the motor 1. The movable contact plate 52 is formed from a conductive metal material in the embodiment described above but may be formed from two or more conductive metal materials.

In the embodiment described above, the plate engagement projection 68 includes two contact walls 68*b* and the coupling wall 68*a*, which couples the contact walls 68*b*, and is H-shaped as viewed from the direction of the axis L. However, the shape of the plate engagement projection 68 is not limited in such a manner. For example, the plate engagement projection 68 may be cylindrical or polygonal.

In the embodiment described above, the projection hook 52*h* has a length between the basal end and the distal end that is greater than that of the other fourteen hooks 52*g*. However, the projection hook 52*h* may have the same length as the other fourteen hooks 52*g*.

In the embodiment described above, each hook 52*g* widens from the basal end towards the distal end. However, each hook 52*g* may be formed so that the width is constant from the basal end to the distal end. Alternatively, each hook 52*g* may be narrowed from the basal end towards the distal end. Further, each hook 52*g* may include a through hole extending in the thicknesswise direction. In this case, the resin material of the first to third arcuate ribs 67*a* to 67*c* enters the through hole. This further ensures that the hooks 52*g* are not separated from the first to third arcuate ribs 67*a* to 67*c* and further securely fixes the movable contact plate 52 to the holding member 53.

In the embodiment described above, the movable contact plate 52 includes fifteen hooks 52*g*. However, the number of hooks 52*g* arranged in the movable contact plate 52 may be fourteen or less or be sixteen or more. In the embodiment described above, the hooks 52*g* are embedded in the first to third arcuate ribs 67a to 67c. However, the hooks 52g only need to be embedded in at least one of the radial ribs 66 and the first to fourth arcuate ribs 67a to 67d. The movable contact plate 52 does not necessarily have to include the hooks 52g when bending of the rotation plate 51 and separation of the movable contact plate 52 and the holding member 53 do not occur.

In the embodiment described above, the holding member 53 includes the twenty radial ribs 66 and the four arcuate ribs 67a to 67d. However, the number of radial ribs 66 and the number of arcuate ribs 67a to 67d in the holding member 53 are not limited in such a manner.

Figure 11:
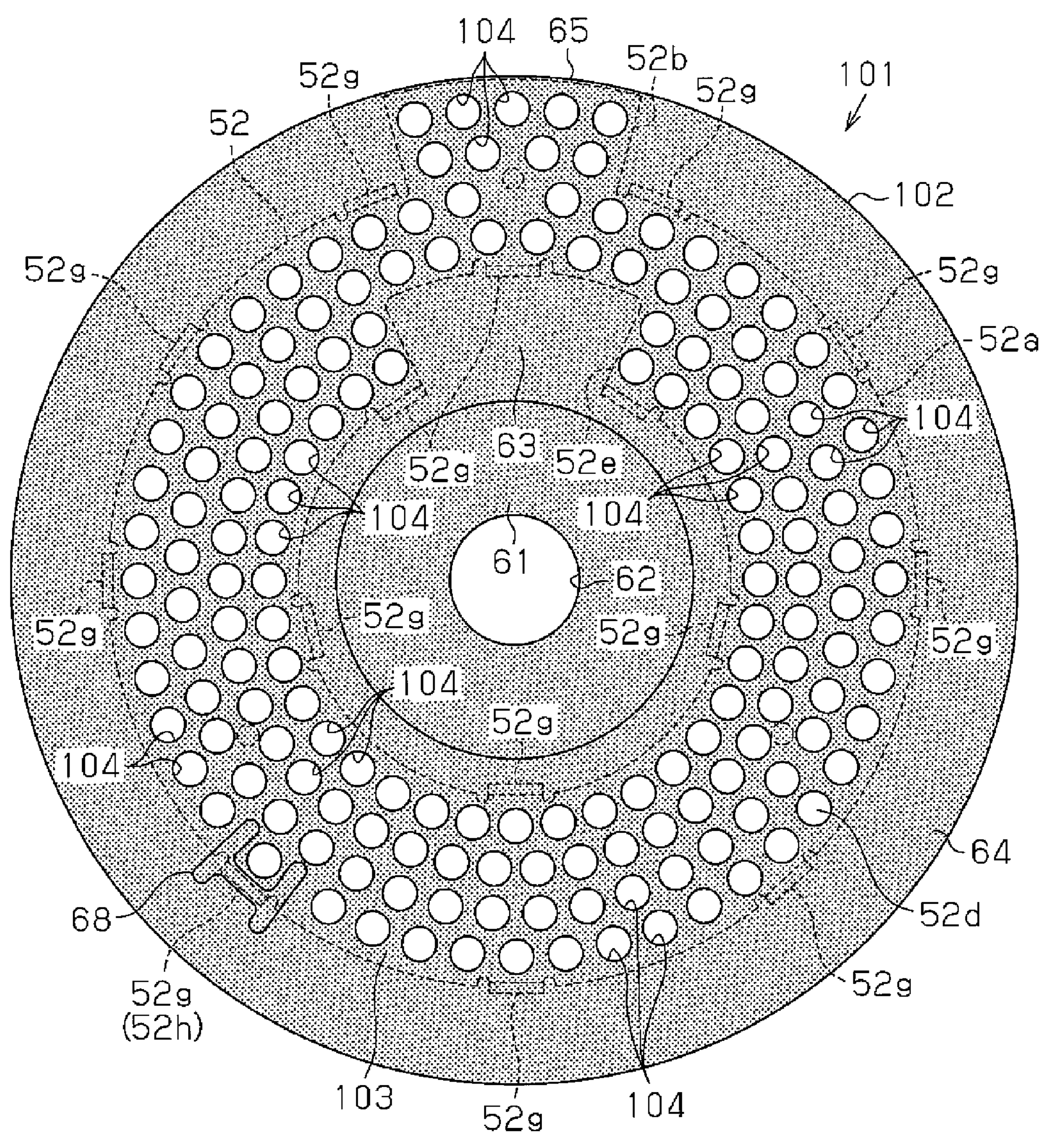
FIG. 11 is a rear view showing a further embodiment of a rotation plate.

In the embodiment described above, the perforated portion 71 includes the radial ribs 66 and the first to fourth arcuate ribs 67a to 67d formed at locations corresponding to the movable contact plate 52. Further, the exposing holes 72 of the perforated portion 71 are defined by the mesh of the radial ribs 66 and the first to fourth arcuate ribs 67a to 67d. The shapes of the perforated portion 71 and the exposing hole 72 are not limited in any manner as long as the perforated portion 71 is formed on the holding surface 52d and includes the exposing holes 72, which expose the holding surface 52d. For instance, referring to FIG. 11, a rotation plate 101 may include a holding member 102 provided with a perforated portion 103 having a plurality of circular exposing holes 104. Further, the shape of an exposing hole may be elliptical, polygonal, or the like. Moreover, the perforated portion may include exposing holes with different shapes at locations corresponding to the movable contact plate 52.

Preferably, the slide contact surface 52c, the surface at the side of the slide contact surface 52c of the non-conducting portion 63, and the surface at the side of the slide contact surface 52c of the outer circumference holding portion 64 may be flush with one another. In other words, the movable contact plate 52 and the holding member 53 are fixed to each other so that the surface of the movable contact plate 52 (slide contact surface 52c) is continuously flush with the surface of the holding member 53. In this case, the slide contact surface 52c, the surface at the side of the slide contact surface 52c of the non-conducting portion 63, and the surface at the side of the slide contact surface 52c of the outer circumference holding portion 64 can be easily formed in a state flush with one another by integrally molding the movable contact plate 52 and the holding member 53 like in the embodiment described above.

In the embodiment described above, the wiper W is coupled to the distal end of the output shaft 15 by the link mechanism but may be directly coupled to the distal end of the output shaft 15.

The present examples and embodiments are to be considered as illustrative and not restrictive, and the invention is not to be limited to the details given herein, but may be modified within the scope and equivalence of the appended claims.

What is claimed is:

1. A motor comprising:

a motor unit that generates rotation;

a deceleration mechanism that decelerates the rotation, wherein the deceleration mechanism includes an output shaft, which is coupled to a wiper, and a worm wheel, which rotates integrally with the output shaft;

a rotation plate that is rotatable together with the worm wheel, the rotation plate including: a movable contact plate that forms a predetermined conductive pattern; and a holding member that holds the movable contact plate, wherein the holding member is formed from an insulating resin material; and a plurality of fixed contact terminals that slide in contact with a surface of the rotation plate and the movable contact plate to detect a rotational position of the output shaft with the rotation plate, wherein the motor unit is supplied with power in accordance with the rotational position of the output shaft detected with the rotation plate and the fixed contact terminals, and wherein the movable contact plate and the holding member are molded integrally and fixed to each other so that a surface of the movable contact plate is exposed and does not project outward from a surface of the holding member.

2. The motor according to claim 1, wherein the movable contact plate and the holding member are fixed to each other so that the surface of the movable contact plate is continuously flush with the surface of the holding member.

3. The motor according to claim 1, wherein the movable contact plate includes a flat slide contact surface and a holding surface opposite to the slide contact surface, the holding member includes a perforated portion at a location corresponding to the movable contact plate, and the perforated portion includes a plurality of exposing holes that expose the holding surface.

4. The motor according to claim 3, wherein the holding member includes a plurality of radial ribs and a plurality of arcuate ribs, the radial ribs extend radially on the holding surface from a center of rotation of the rotation plate, the arcuate ribs are concentric and extend about the center of rotation of the rotation plate, each of the arcuate ribs couples adjacent ones of the radial ribs in a circumferential direction, the perforated portion includes the radial ribs and the arcuate ribs arranged at locations corresponding to the movable contact plate, and the perforated portion includes the exposing holes defined in a mesh formed by the radial ribs and the arcuate ribs.

5. The motor according to claim 4, wherein the movable contact plate includes a plurality of hooks embedded in at least either one of the arcuate ribs and the radial ribs.

6. The motor according to claim 5, wherein each of the hooks widens from its basal end toward its distal end.

7. The motor according to claim 5, wherein the holding member includes a plate engagement projection that projects toward a rotating body, which is arranged facing the holding surface, the plate engagement projection is engaged in a rotating direction with a rotating body engagement projection arranged on the rotating body, and the movable contact plate includes a projection hook embedded in the plate engagement projection and having a length between its basal end and its distal end that is greater than that of the hooks.

8. The motor according to claim 7, wherein the plate engagement projection is flat and orthogonal to a rotating direction of the rotation plate, the plate engagement projection includes two contact walls, which are spaced apart from each other in the rotating direction of the rotation plate, and a coupling wall, which couples the contact walls, and the projection hook is embedded in the coupling wall.

9. The motor according to claim 5, wherein the movable contact plate includes an annular first contact portion and a second contact portion, which projects outward in a radial direction from the first contact portion, and the hooks are formed in at least opposite circumferential sides of a basal part of the second contact portion on an outer circumferential edge of the first contact portion and a radially inner side of the second contact portion on an inner circumferential edge of the first contact portion.

10. The motor according to claim 9, wherein the holding member includes a distal end covering portion that covers a distal part of the second contact portion from a side of the holding surface to a side of the slide contact surface.

11. The motor according to claim 3, wherein the movable contact plate includes an annular first contact portion and a second contact portion, which projects outward in a radial direction from the first contact portion, and the holding member includes a distal end covering portion that covers a distal part of the second contact portion from a side of the holding surface to a side of the slide contact surface.

12. The motor according to claim 11, wherein the distal part of the second contact portion includes a chamfer formed by chamfering a corner at a side of the slide contact surface of the second contact portion.

13. The motor according to claim 3, wherein the holding member includes a resin inlet located in a part of the holding member at a side corresponding to the side of the holding surface with respect to the movable contact plate, and the location of the resin inlet corresponds to a location of a gate used to charge the resin material, which is melted, into a mold, which is used to form the holding member.

14. A motor comprising:
a motor unit that generates rotation;
a deceleration mechanism that decelerates the rotation, wherein the deceleration mechanism includes an output shaft, which is coupled to a wiper, and a worm wheel, which rotates integrally with the output shaft;
a rotation plate that is rotatable together with the worm wheel, the rotation plate including: a movable contact plate forming a predetermined conductive pattern; a holding member formed from an insulating resin material, wherein the movable contact plate is fixed integrally to one surface of the holding member; and
a plurality of fixed contact terminals that slide in contact with the movable contact plate and the surface of the holding member to detect a rotational position of the output shaft with the rotation plate,
wherein
the motor unit is supplied with power in accordance with the rotational position of the output shaft detected with the rotation plate and the fixed contact terminals,
the movable contact plate includes a slide contact surface, which faces the fixed contact terminal, and a holding surface opposite to the slide contact surface,
the holding member includes a perforated portion at a location corresponding to the movable contact plate, and
the perforated portion includes a plurality of exposing holes that expose the holding surface.

15. The rotation plate motor according to claim 14, wherein the holding member includes a plurality of radial ribs and a plurality of arcuate ribs,
the radial ribs extend radially on the holding surface from a center of rotation of the rotation plate,
the arcuate ribs are concentric and extend about the center of rotation of the rotation plate,
each of the arcuate ribs couples adjacent ones of the radial ribs in a circumferential direction,
the perforated portion includes the radial ribs and the arcuate ribs arranged at locations corresponding to the movable contact plate, and
the perforated portion includes the exposing holes defined in a mesh formed by the radial ribs and the arcuate ribs.

16. The motor according to claim 15, wherein the movable contact plate and the holding member are molded integrally and fixed to each other, and the movable contact plate includes a plurality of hooks embedded in at least either one of the arcuate ribs and the radial ribs.

17. The rotation plate motor according to claim 16, wherein the holding member includes a resin inlet located in a part of the holding member at a side corresponding to the side of the holding surface with respect to the movable contact plate, and the location of the resin inlet corresponds to a location of a gate used to charge the resin material, which is melted, into a mold, which is used to form the holding member.

18. The motor according to claim 14, wherein the movable contact plate includes an annular first contact portion and a second contact portion, which projects outward in a radial direction from the first contact portion, and the holding member includes a distal end covering portion that covers a distal part of the second contact portion from a side of the holding surface to a side of the slide contact surface.

19. A rotation plate including a surface, wherein a fixed contact terminal slides in contact with the surface of the rotation plate, the rotation plate comprising:
a movable contact plate that forms a predetermined conductive pattern; and
a holding member that holds the movable contact plate, wherein the holding member is formed from an insulating resin material,
wherein
the movable contact plate and the holding member are molded integrally and fixed to each other so that a surface of the movable contact plate is exposed and does not project outward from a surface of the holding member,
the movable contact plate includes a flat slide contact surface and a holding surface opposite to the slide contact surface,
the holding member includes a perforated portion at a location corresponding to the movable contact plate,
the perforated portion includes a plurality of exposing holes that expose the holding surface,
the holding member includes a resin inlet located in a part of the holding member at a side corresponding to the side of the holding surface with respect to the movable contact plate, and
the location of the resin inlet corresponds to a location of a gate used to charge the resin material, which is melted, into a mold, which is used to form the holding member.

* * * * *

UNITED STATES PATENT AND TRADEMARK OFFICE

CERTIFICATE OF CORRECTION

PATENT NO. : 9,231,458 B2
APPLICATION NO. : 13/442679
DATED : January 5, 2016
INVENTOR(S) : Takao Yamaki, Seiichi Murakami and Takeshi Hamanaka It is certified that error appears in the above-identified patent and that said Letters Patent is hereby corrected as shown below:

Title page, item (73), first Assignee, delete “AMSO” insert therefor --ASMO--

Title page, item (73), second Assignee, delete “ANAPACHI-GUN” insert therefor --ANPACHI-GUN--

Signed and Sealed this
Twenty-eighth Day of June, 2016

Michelle K. Lee
*Director of the United States Patent and Trademark Office*